No. 823,523. PATENTED JUNE 19, 1906.
C. F. GRAY.
CANNED GOODS COOKER.
APPLICATION FILED AUG. 31, 1905.
3 SHEETS—SHEET 1.
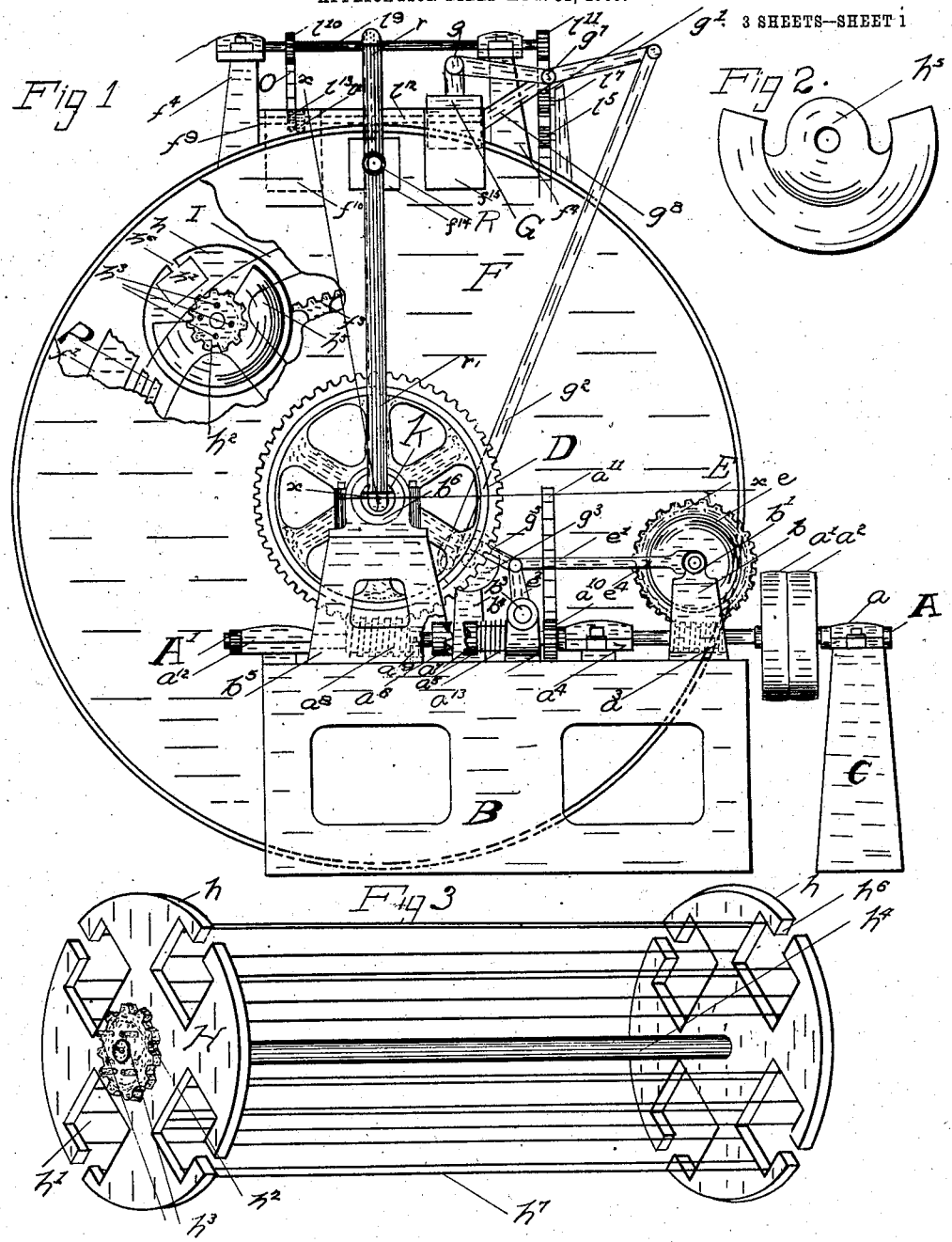
WITNESSES:
INVENTOR.
Charles F. Gray
BY
Walter A. Knight
ATTORNEY.

No. 823,523. PATENTED JUNE 19, 1906.
C. F. GRAY.
CANNED GOODS COOKER.
APPLICATION FILED AUG. 31, 1905.
3 SHEETS—SHEET 2.
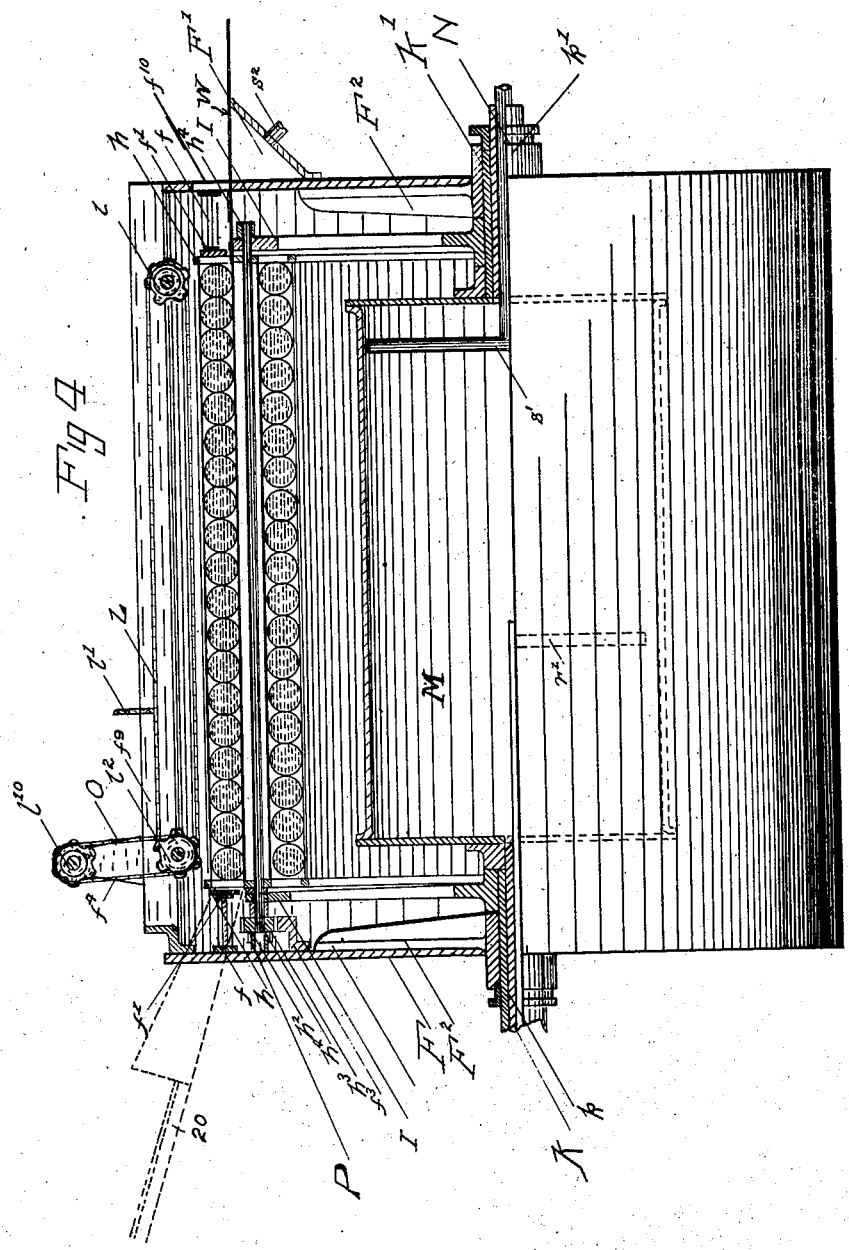
WITNESSES:
INVENTOR.
Charles F. Gray
BY Walter A. Knight.
ATTORNEY.

No. 823,523. PATENTED JUNE 19, 1906.
C. F. GRAY.
CANNED GOODS COOKER.
APPLICATION FILED AUG. 31, 1905.
3 SHEETS—SHEET 3.
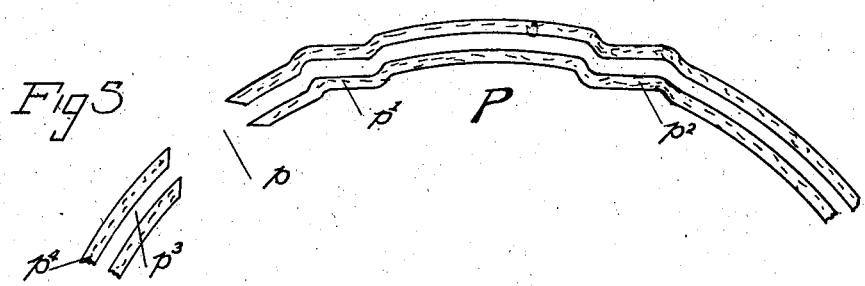
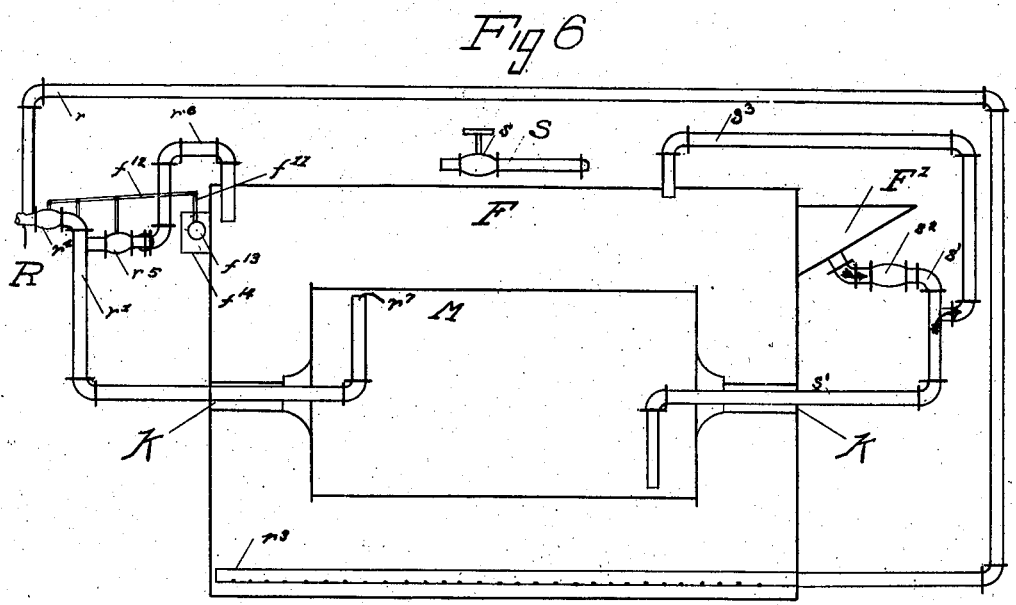
WITNESSES:
INVENTOR.
Charles F. Gray
BY
Walter A. Knight
ATTORNEY.

UNITED STATES PATENT OFFICE.

CHARLES F. GRAY, OF INDIANAPOLIS, INDIANA, ASSIGNOR TO WALTER A. KNIGHT, TRUSTEE, OF CINCINNATI, OHIO.

CANNED-GOODS COOKER.

No. 823,523.     Specification of Letters Patent.     Patented June 19, 1906.

Application filed August 31, 1905. Serial No. 276,553.

*To all whom it may concern:*

Be it known that I, CHARLES F. GRAY, a citizen of the United States, residing at Indianapolis, in the county of Marion and State of Indiana, have invented new and useful Improvements in Canned-Goods Cookers, of which the following is a specification.

My invention relates to a canned-goods cooker, so constructed as to afford a virtually continuous operation of injecting uncooked goods and ejecting cooked goods.

Heretofore the cooking has been chiefly in kettles adapted to be filled with one or more baskets, each usually having three layers of cans and each basket being submerged and removed separately. One objectionable result in this method of cooking is its inequality. For instance, with three baskets of three layers each the top basket would be undercooked, the bottom basket would be overcooked, while each middle layer of cans, being abutted and protected by the upper and lower layers, would be heated more slowly and necessarily cooked less. It is also apparent that as the cans always remained in one position the goods failed to change their position in the can, which is necessary for thorough and rapid cooking. Another objectionable feature with this kind of cooking is the amount of labor required to handle the cans.

The object of my invention is to devise a machine which will sustain an even cooking—that is, each can will be submerged the same length of time in the suitably-heated fluid. I also wish to diminish the amount of labor to a minimum, one man being able to take entire care of my machine. My machine keeps the contents of the cans agitated, thus insuring correct and even cooking. The floor-space occupied is less than with any other method used in canning-factories where other cookers are employed.

In general my cooker includes in its construction two tanks, cylindrical in shape, the smaller one (the overflow-tank) inclosed in the larger one. In said larger tank, rotatively attached to each end of short shafts running horizontally into the tank from each end, is a spider. One of these spiders may be attached to each end of the small tank, and together they sustain a plurality of carrying-reels, which rotate with the spiders, said reels carrying the charge of cans. This main reel-frame receives its motion from the shaft which extends into the tank from the end of the machine where the power is applied, which shaft is driven by worm-and-gear or other convenient mechanism. The aperture to receive the charge is opened and closed automatically, and charging may be accomplished by the force of gravity, while the discharging is brought about by means of an endless chain or other convenient mechanism so provided and constructed as to accomplish the purpose and may or may not be assisted by gravity.

In the accompanying drawings, illustrating my invention, Figure 1 is an end elevation of my cooker with part of the large tank-shell broken away, showing one reel in position. Fig. 2 is a plan view of the plate which prevents the three frames of cans in each reel farthest away from the greatest circumference of the large tank from rolling out of the reels. Fig. 3 is an isometric view of one of the reels. Fig. 4 is a sectional view of the large tank and inclosed mechanism along the broken line $x\,x\,x$ in Fig. 1. Fig. 5 is a plan view of the upper part of the track which prevents the reels from revolving and also brings them into a suitable position for being charged and discharged. (Lower part broken away.) Fig. 6 is a diagrammatic view showing circulation of water and steam.

Referring to the drawings, F is the large tank, with heads reinforced by braces $F^2$, adapted to be set on a suitable foundation. (Not shown in the drawings.) Hollow shafts K K' extend horizontally into the large tank F from each end. Shaft K is journaled by journal $b^6$, supported by bracket $b^5$, while K' is journaled by journal N, said journal being supported in any suitable manner. (Support not shown in the drawings.)

Shaft A A' is parallel to the end of tank F and is journaled by any suitable journals, as $a$, $a^4$, $a^9$, and $a^{12}$, said journals being secured to supports P and C, which rest on foundation. Near one end of shaft A and between supports B and C are pulleys $a'\,a^2$, attached to said shaft, one of said pulleys being loose, the other being the drive for the whole mechanism. Worm $a^3$, rotatively attached to shaft A, meshes with gear E, which is journaled by journal $b'$, said journal being supported by bracket $b$, which is secured to support B. On the side of gear E and at a convenient distance back from its periphery is a cam-groove $e$, in which works pin $e^4$, said pin being connected to lever-rod $e'$, which in turn connects with lever-rods $e^2$ and $g^5$. Lever $e^2$ is fulcrumed at $b^3$ on clutch-sleeve $a^{13}$, which carries a spring $a^5$, adapted to normally hold clutch member $a^6$ $a^7$ in operative contact, said clutch member $a^7$ being splined on shaft A. Lever-rod $g^5$ connects with disk $g^3$, which is journaled in supports $b^4$, which in turn is held by support B. Also attached to wheel $g^3$ is lever-rod $g^2$, said rod connecting with lever-rod $g'$, which is fulcrumed at bearing $g^7$ by means of suitable support $g^8$. Rod $g'$, by means of pin-joint $g$, connects with shutter G, which opens and closes the can-hopper entrance $f^{15}$.

Clutch member $a^6$ is rotatively attached to shaft A'. Clutch member $a^7$, slidable on shaft A, is operated by combination-lever $e^2$ $e'$ and cam-groove $e$ Worm $a^8$, rotatively attached to shaft A', meshes with gear D, said gear being attached to shaft K.

A convenient device for ejecting cans from can-frames is provided as follows: At a convenient point on shaft A is rotatively attached small sprocket-wheel $a^{10}$, over which a chain $a^{11}$ runs, then over the idle sprockets $l^7$ and $l^5$, and transmits power to sprocket $l^{11}$, which is attached to shaft $l^9$, said shaft being journaled in supports $f^4 f^4$. Also attached to shaft $l^9$ is sprocket-wheel $l^{10}$, from which a chain O runs to sprocket-wheel $l^{13}$. (Shown in the drawings, Fig. 1, dotted, just back of sprocket $l^2$ and attached to the same shaft $l^{12}$ as that of sprocket $l^2$.) Shaft $l^{12}$ is journaled in any suitable manner, as in the projecting part $f^9$ of tank F. Power being transmitted to sprocket $l^2$, as aforedescribed, said sprocket transmits power to an endless chain L, which works over idle sprocket $l$. Said chain L is provided with a projection $l'$, which aids in the discharging of the cans.

The reels H, of any suitable number, revolve with the reel formed by spiders I, said small reels being constructed with two or more disks $h$ $h$, containing two or more holes, each (shown in drawings with four holes) to admit cans. These disks are provided with a plurality of rods $h^7$, angle-irons, or the like on their inner faces, which together form a suitable frame to hold the cans. Each of the disks $h$ is provided with passage-ways $h^6$, cut through from the openings $h'$ to the periphery to permit the unobstructed passage of the extension-link $l'$ in ejecting the cans from the small reels onto a suitable platform W. A shaft $h^4$ extends axially through each of these reels and is journaled in the spiders. Said shaft has attached near its extreme end and outside of the spider, preferably on the power end of the machine, a gear-wheel $h^2$. From said gear projects outwardly four pins $h^3$, adapted to slide around the track P, as shown in Fig. 5. Plate $h^5$ is suitably fastened to journal of shaft $h^4$, so as to prevent the cans in the three frames farthest away from the greatest circumference of the large tank from rolling out or getting caught between the sides of the tank and any of the mechanism.

A ring $f'$, attached to the large tank by suitable brackets $f$, extends entirely around the tank at each end, except at the entrance and exit of the cans, where it is broken away to allow the cans to pass in and out—that is, each ring has only one place broken away. The teeth of the gear-rack $f^3$ mesh with the teeth of gear $h^2$ and give it a quarter-turn, thus revolving each reel H one-fourth turn when it reaches the proper point.

At the same end of the machine as the gear $h^2$ is attached to the tank in any convenient manner (in the drawings riveted to the head) a circular track P with slot $p^3$, adapted to receive and hold two of the pins $h^3$ at a time, or the pins may simply run over or under a raised portion, as $p^4$, as a guide. A portion $p$ of track P is broken away to allow for the quarter-turning aforedescribed—that is, the track P at this point no longer holds the reels against turning. The horizontal portion of the track $p'$ $p^2$ causes the floor of the top frame of the reels aforedescribed to become horizontal, thus affording a more convenient charging and discharging of the cans. Stuffing-boxes $k$ $k'$ keep water from leaking out of tank F.

Pipe S (see Fig. 6) connects with any convenient water-supply and may be in such a position that by opening the valve $s$ the water can flow into the opening at the top of the tank F. Steam-pipe R connects with a suitable steam-reservoir (not shown) and near the tank connects with two branch pipes $r$ and $r'$. Pipe $r$ conveys the steam to the bottom of tank F, where one or more pipes $r^3$ enter the tank. Said pipe or pipes $r^3$ lie along the bottom of the tank F, preferably extending the full length of said tank, and that portion of said pipe $r^3$ which is on the inside of the tank F is perforated, allowing the steam to escape in the fluid in the said tank F, and thus raise said fluid to the desired temperature for cooking.

When injecting cans into the empty or partially-empty cooker, there is a constant overflow, which is caused by the displacement of the water from the cans coming in at the momentary full stop, and provision is necessary to take care of this overflow, which provision consists of a combination of valves, pipes, and the tank M. When the cans enter the reels, the water displaced by them runs into a suitable receptacle F', situated near the place of exit of the cans. Leading from said receptacle through the shaft K' into the tank M and extending to its bottom is a pipe $s'$, at a convenient point on which is check-valve $s^2$, which allows the water to flow in only one direction, as indicated by arrow.

Float-valve $r^4$ is connected, by means of lever $f^{12}$, to float $f^{13}$, which is suspended in receptacle $f^{14}$ by means of rod $f^{11}$, said receptacle being in open connection with tank F. Pipe $r'$ leads from said float-valve through the center of shaft K into tank M and extends to near the top of said tank. Connecting pipe $r'$ to tank F is pipe $r^6$, at a convenient point on which is float-valve $r^5$, attached to the same lever as that of float-valve $r^4$, so that when float-valve $r^5$ is open float-valve $r^4$ is closed, and vice versa.

The operation of this system of pipes is as follows: Assume that the charging has been going on for some time and that the overflow fluid above alluded to has been conveyed into the tank M and also that subsequent to such overflow from the loss of fluid by evaporation the fluid has sunk in tank F below the desired level. If this is the case, the float $f^{13}$ would sink, the valve $r^4$ would be opened, and valve $r^5$ would be closed. The steam by means of pipe $r'$ would pass into small tank M at $r^7$, exert pressure on the fluid in said tank, and cause said fluid to rise in pipes $s'$. As the check-valve $s^2$ would not allow the fluid to pass through it flowing in the above-stated direction, said fluid would be forced up through pipe $s^3$, as indicated by arrow, which would convey it back into tank F. The fluid by this means would continue to flow from small tank M into the large tank F until the predetermined level of fluid would be reached, when the float $f^{13}$ would be raised by force of buoyance, and thus close valve $r^4$, shutting off the steam and opening valve $r^5$, allowing the excess of steam in tank M to pass into the large tank F through opening $r^7$, pipe $r'$, valve $r^5$, and pipe $r^6$.

The operation of the cooker mechanism is as follows: After the tank has been filled with water in the manner aforedescribed and the steam has heated it to the cooking temperature, assuming that the clutch $a^7$ is out of contact with the clutch $a^6$, the shutter G in this case would be up and the hermetically-sealed cans allowed to pass into one frame of a reel H, which at that time would be in suitable position to receive said cans. Now the belt (not shown in the drawings) could be shifted from the loose to the tight pulley on shaft A. Then said shaft A would begin to revolve, transmitting the same movement to worm $a^3$, which in turn would cause gear E to revolve. The pin $e^4$, working in cam $e$ and attached to lever $e'$, in following the grooved cam would cause the said lever $e'$ to be drawn toward the right as the observer would view the cooker in Fig. 1. This motion of lever $e'$, with the aid of spring $a^5$ and lever $e^2$, would cause the clutch $a^6$ $a^7$ to come in positive contact.

As lever $g^5$ by means of lever $e'$ and cam $e$ is drawn to the right or in the same direction as the motion of $e'$ disk $g^3$, with which lever $g^2$ connects, revolves in the same direction that lever $e'$ is moved, and by this motion bent lever $g'$ is forced upward. Since lever $g^2$ imparts its motion to lever $g'$, the shutter G, which connects with $g'$, is closed. As the clutch $a^7$ is now in contact, the whole shaft A A' is revolving, and by means of worm $a^8$ motion is imparted to gear D and shaft K, causing said shaft to revolve and also reel formed by spiders I, which carries the small reels. The small reel, which is to have its top frame of cans discharged, is turned one-fourth way round, when it is just at the broken-out portion $p$ of track P. The turning is accomplished by the meshing of gear-teeth $h^2$ with teeth of gear-rack $f^3$ and the motion of the spider. After the said turning has taken place the pins $h^3$ are in position to follow the groove $p^3$ of the track P, and the floor of the upper row of cans in this reel is brought to a horizontal position by means of the deflected portion $p'$ of track P. Just at this point the clutch member $a^7$ is drawn from contact with $a^6$ by the same levers and cam as aforedescribed, but working in an opposite direction, and by this action of the clutch the spider stops. Likewise the shutter is lifted or the can's entrance opened by the same set of levers aforedescribed, said levers working in said opposite directions. This action of the levers is self-evident when considering the description of their action when working in the direction necessary to throw the clutch in contact.

The chain L, which receives its motion through combinations of sprockets and chains aforedescribed, is so timed that at this full momentary stop the projection $l'$ comes just behind the first can in the reel whose top frame is being discharged. At all other times this projection $l'$ does not intercept any of the other mechanism. The chain moves along, carrying the projection $l'$, which is behind the last can, and pushes them all out at the exit $f^{10}$. At the same time the reel to be discharged of the load of cans in its upper frame comes into position the reel which was discharged just before the one described moved around and by means of the deflected portion $p^2$ of track P has had the floor of its top frame brought to a horizontal position, and as the entrance is open the hermetically-sealed cans will be allowed to roll down into said reel along any suitable track 20 on the outside leading to the can's entrance.

It can readily be seen that the continuous operation of this machine is a repetition of these actions in the foregoing description. Also it is self-evident that each can will be submerged the same length of time that it takes the spider to make four complete revolutions, as each reel H is revolved one-fourth turn only each time it passes the gear-rack $f^3$ Any means of changing the speed of the main shaft A A' will give the several lengths of time required for cooking different canned articles, such as vegetables, fruits, meats, &c.

I claim as my invention and desire to secure by Letters Patent of the United States—

1. A canned-goods cooker having a tank adapted to hold the cooking liquid, a main revolving reel within said tank, a plurality of secondary reels sustained upon said main reel, a plurality of can-frames formed within said secondary reels; means for depositing cans into and ejecting cans from said frames, means for properly actuating said mechanism and means for heating the cooking fluid in said tank to cook the goods.

2. A canned-goods cooker having a main tank adapted to hold the cooking liquid, a main reel revolving within said tank, a plurality of revolving secondary reels sustained upon said main reel, a plurality of can-frames formed within said secondary reels, means for depositing cans into and ejecting cans from said frames, a secondary tank, pipes and valves connecting said main and secondary tanks, means for actuating said cooker mechanism, and means for heating the cooking fluid in said tank to cook the goods.

3. In a canned goods cooker a main cooking-tank, a secondary tank within the main tank, pipe and valve connections adapted to convey an excess of fluid from the main tank to the secondary tank and vice versa, pipe connections leading from steam-supply to two points within the secondary tank and one in main tank, a valve on said steam-pipes leading from said steam-supply to one point in said secondary tank and another on pipe leading to said main tank, and means for automatically operating said valves by the rise and fall of fluid in the main tank.

4. In a cooker for canned goods a plurality of reels adapted to be rotated, a plurality of frames in said reels, adapted to receive and hold cans, means for depositing said cans by gravity, and means for ejecting said cans.

5. In a cooker for canned goods a plurality of reels adapted to be rotated, a plurality of open-ended can-frames in said reels, adapted to receive a plurality of cylindrical cans, means for closing the open ends of said frames at all points except where opened for depositing or receiving cans, and means for suitably rotating said reels.

6. In a cooker for canned goods a tank for the cooking fluid an overflow-tank, suitable steam and fluid connections between said tanks, can-carrying mechanism within said main tank, mechanism for alternately rotating and stopping said can-carrier, means for ejecting said cans from the carrier and means for automatically closing and opening the entrance for cans.

7. In combination with a canned-goods cooker, reels, H, having two or more disks, $h$, having a plurality of can-openings, $h'$, connected with the periphery by spaces, $h^6$, frame sides, $h^7$, shaft, $h^4$, extending axially through the reel, gear, $h^2$, rotatively attached to said shaft, and as many pins, $h^3$, fixed in the side of said gear, as there are frames in the reel.

8. A canned-goods cooker having a tank, F, adapted to contain the cooking substance, said tank having a suitable can inlet at one end and outlet at the other, an overflow-tank, M, within the main tank, spiders, I, I, one rotatively attached to each end of tank, M, a revolving reel, shafts, K, K', upon which in suitable journals main reel revolves, a plurality of small revolving reels H, with a plurality of can-frames therein, a gear, $h^2$, with pins, $h^3$, on the shaft, $h^4$, of each reel, H, a track, P, with slot, $p^3$, in which pins, $h^3$, are adapted to slide, rack, $f^3$, adapted to engage gear, $h^2$, at the opening, $p$, in track, P, said opening in track deflections $p'$, $p^2$, in track, P, to carry upper reel-frames into registry with tank inlet and outlet, plate, $h^5$, ring, $f'$, sprocket-chain, L, carrying projection, $l'$, adapted to eject cans from frame, means for intermittently actuating said sprocket-chain, the shutter, G, and attendant mechanism adapted to intermittently rise and fall to admit and shut off cans from reel-frames, and the main driving-shaft, A, A', and attendant parts, gear, D, and the attendant parts.

In testimony whereof I have hereunto set my hand in presence of two subscribing witnesses.

CHARLES F. GRAY.

Witnesses:
 JOSEPH R. GARDNER,
 CARROLL H. RICHARDS.